(12) United States Patent
Hueftle et al.

(10) Patent No.: US 8,528,418 B2
(45) Date of Patent: Sep. 10, 2013

(54) FLOW METER HAVING A THERMAL DECOUPLING ELEMENT SEPARATING AN ULTRASONIC TRANSDUCER AND THE FLOW PIPE

(75) Inventors: Gerhard Hueftle, Aspach (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 314 days.

(21) Appl. No.: 12/887,150

(22) Filed: Sep. 21, 2010

(65) Prior Publication Data
US 2011/0072910 A1   Mar. 31, 2011

(30) Foreign Application Priority Data
Sep. 25, 2009  (DE) .......................... 10 2009 045 020

(51) Int. Cl.
*G01F 1/66* (2006.01)
(52) U.S. Cl.
USPC ...................................... 73/861.28
(58) Field of Classification Search
None
See application file for complete search history.

(56) References Cited

U.S. PATENT DOCUMENTS

| 4,365,518 | A  | * | 12/1982 | Zacharias, Jr. | ............. 73/861.31 |
| 4,831,885 | A  | * | 5/1989  | Dahlin | ...................... 73/861.355 |
| 5,515,733 | A  | * | 5/1996  | Lynnworth | ............... 73/861.27 |
| 6,539,812 | B1 | * | 4/2003  | Bergamini | .................. 73/861.29 |
| 2007/0227263 | A1 | * | 10/2007 | Fukano et al. | ............. 73/861.27 |
| 2008/0196511 | A1 | * | 8/2008  | Ehring et al. | .............. 73/861.31 |
| 2009/0044636 | A1 | * | 2/2009  | Hope | ......................... 73/861.28 |

FOREIGN PATENT DOCUMENTS

| DE | 10 2004 061 404 |   | 7/2006 |
| EP |    605 944 |   | 7/1994 |
| JP |    04343026 | A | * 11/1992 |

* cited by examiner

*Primary Examiner* — Harshad R Patel
(74) *Attorney, Agent, or Firm* — Kenyon & Kenyon LLP

(57) ABSTRACT

A flow meter for use in a flowing fluid medium includes at least one ultrasonic transducer and at least one measuring section having at least one flow pipe through which a fluid medium flows in a main direction of flow. The ultrasonic transducer is equipped to emit ultrasonic signals essentially parallel to the main direction of flow into the measuring section. The ultrasonic transducer is separated from the flow pipe by at least one thermal decoupling element. The thermal decoupling element is equipped to reduce heat transfer from the flow pipe to the ultrasonic transducer.

16 Claims, 1 Drawing Sheet

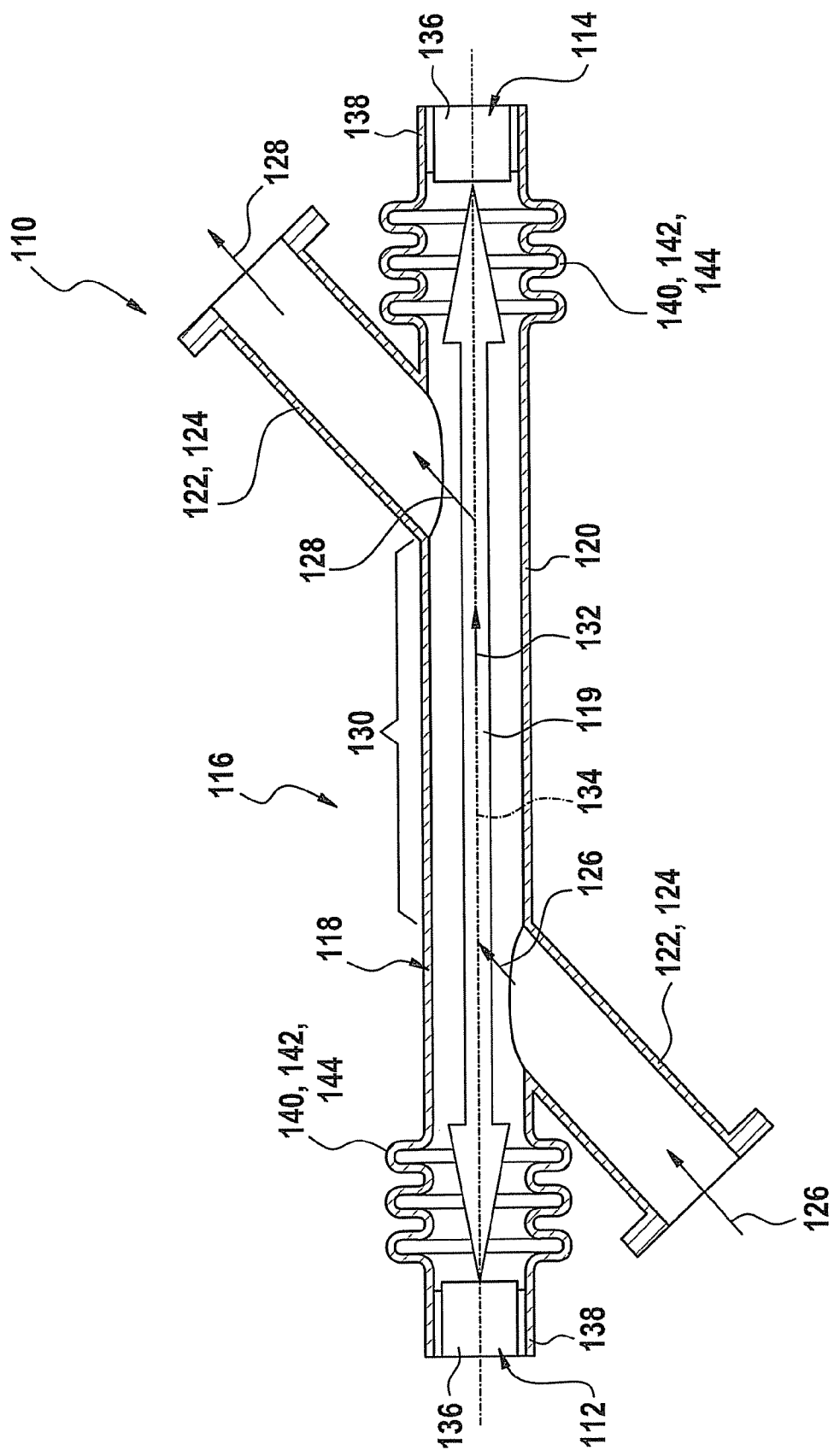

FLOW METER HAVING A THERMAL DECOUPLING ELEMENT SEPARATING AN ULTRASONIC TRANSDUCER AND THE FLOW PIPE

BACKGROUND INFORMATION

Flow meters, which may be used to measure the flow of a fluid medium, are known from the related art. For example, these are equipped to detect velocities of flow, mass flows or volume flows, or combinations of the aforementioned measured variables of the fluid medium. For example, the flow meters may be used in a flow pipe.

A known measurement principle is based on the use of ultrasonic signals, which are emitted into the flowing fluid medium. One, two or more ultrasonic transducers may be used, emitting ultrasonic signals into the fluid medium and/or receiving them from the fluid medium, namely at an angle such that the ultrasonic signals have at least one propagation component in or against a main direction of flow of the flowing medium. For example, the flow of the fluid medium may then be determined from transit time differences for the propagation into and against the direction of flow. Other methods are based, for example, on reflection of ultrasonic signals and/or pulse technologies. Flow meters in general are known from the related art, e.g., from German Patent No. DE 10 2004 061404 or European Patent No. EP 0605944. For example, it is also possible to go back to the measurement principles disclosed in these documents within the framework of the present invention to infer the flow of the fluid medium from ultrasonic signals.

However, known ultrasonic transducers usually have a limited spectrum of application. For example, many ultrasonic transducers known from the related art have a sensitive response to hot and/or aggressive media, for example, corrosive media, acids, oils or the like. For example, at the present time there are no known measurement methods which do justice to all the requirements of this application for measuring exhaust gas mass flows in internal combustion engines, in particular in the automotive field. Various measurement principles have been tested.

However, known methods are not usually suitable for the conditions occurring in exhaust gas mass flows. For example, high temperatures, usually temperatures significantly above 100° C., occur in exhaust gas mass flows. In addition, contaminants also occur there, for example, in the form of soot, acids, water, oil or other contaminants. Another unfavorable ambient condition is that a high degree of heterogeneity prevails in exhaust gas mass flows. In particular, there may be oscillations of the gas column having frequencies in the range between 10 and 1000 Hz. Traditional flow meters are not usually suitable for such boundary conditions.

SUMMARY OF THE INVENTION

Therefore a flow meter for use in a flowing fluid medium and a method for measurement of a flow of a fluid medium are provided, at least largely avoiding the disadvantages of known flow meters and known methods. In particular the flow meter is suitable for use in fluid media at high temperatures, for example, temperatures significantly above 100° C. and/or in flowing fluid media having high levels of contamination. The flow meter may be used in particular in the exhaust line of an internal combustion engine to measure an exhaust gas flow, for example, an exhaust mass flow and/or an exhaust volume flow and/or a velocity of an exhaust gas. However, other applications are also possible in principle.

The present invention is based on the finding that ultrasonic measurement methods are suitable in principle for measuring fluid media, for example, gases having a high level of contaminants. For example, transit time methods may be used for flow measurement, for example, by comparing the transit time of an ultrasonic signal with the flow and against the flow. Such methods are also very suitable for determining irregular flows, in particular due to their normally linear characteristics. However, as explained above, the required ultrasonic transducers, such as those known from the related art, are not readily suitable at operating temperatures, i.e., temperatures of the fluid medium which are significantly above 100° C. The present invention therefore provides a design of the flow meter in which at least one ultrasonic transducer, preferably two or more ultrasonic transducers, are arranged in such a way that despite the high temperatures of the fluid medium to be measured, for example, they are in a temperature range tolerable for the at least one ultrasonic transducer. In addition, the flow meter may be designed in such a way that optimal measurement conditions prevail for the at least one ultrasonic transducer.

A flow meter is therefore provided for use in a flowing fluid medium, including at least one ultrasonic transducer and at least one measuring section. Within the context of the present invention, an ultrasonic transducer is understood to be an element equipped to emit ultrasonic signals and/or to receive and record ultrasonic signals. For example, the at least one ultrasonic transducer may include at least one transducer core, in which at least one electrical-acoustic transducer element is accommodated. An electrical-acoustic transducer element is in principle any element equipped to convert electrical signals into ultrasonic signals and/or vice-versa. For example, at least one piezoelectric element may be used as the electrical-acoustic transducer element. The transducer core may be accommodated in a housing of the ultrasonic transducer, for example.

A measuring section is understood within the scope of the present invention to be a pipe along which the ultrasonic signals of the at least one ultrasonic transducer are able to propagate. The measuring section according to the present invention includes at least one flow pipe through which the fluid medium flows in a main direction of flow. A flow pipe is understood to be any element through which a medium flows and which is equipped to conduct the flow of the fluid medium. For example, the flow pipe may include one or more tubes, preferably tubes made of a metallic material. Alternatively or additionally, however, plastic materials and/or other materials may also be considered in principle. The flow pipe may have any cross section in principle, for example, a round, square or generally polygonal cross section. The flow pipe is preferably designed to be essentially straight, at least in the zone through which the fluid medium flows and which may extend along the entire flow pipe or along only a portion of the flow pipe.

The at least one ultrasonic transducer is equipped to emit ultrasonic signals essentially in parallel to the main direction of flow into the measuring section. In general, a main direction of flow is to be understood as the main direction of mass transport and/or volume transport of the fluid medium within the flow pipe. Local irregularities such as turbulence on the walls of the flow pipe may be disregarded. Emission essentially parallel to the main direction of flow is to be understood in general within the scope of the present invention as being an emission running preferably exactly parallel or exactly antiparallel. However, deviations of less than 20° from this parallelism, preferably less than 10°, and more preferably less than 5° may be tolerated in principle, although they are less preferred. A measurement exactly in or exactly against the direction of flow provides optimal measurement conditions for the ultrasonic transducer. In this context, it is pointed out that the emission of ultrasonic signals into the fluid medium may also be understood in principle to include the reception of ultrasonic signals from the fluid medium.

The flow pipe forms at least a portion of the measuring section. To solve the problems described above, in particular to solve the thermal problems described here, it is provided that the ultrasonic transducer be separated from the flow pipe by at least one thermal decoupling element. The thermal decoupling element is equipped to reduce heat transfer from the flow pipe to the ultrasonic transducer. In addition, at typical temperatures of the medium of more than 150° C. in the area of the ultrasonic transducer, for example, the decoupling element may be equipped to lower the temperature in the area of the ultrasonic transducer to 90% or less, preferably to 70% or less and more preferably to 20% or less in comparison with the temperature in the area of the flow pipe. Again alternatively or additionally, the thermal decoupling element may be equipped so that the temperatures in the area of the ultrasonic transducer in normal operation are maximally 100° C. or less, preferably maximally 80° C. or less.

The thermal decoupling element is equipped to reduce heat transfer from the flow pipe to the ultrasonic transducer at least in comparison with a direct coupling of the ultrasonic transducer to the flow pipe. In particular the ultrasonic transducer may include, as explained above, a housing, for example, a housing in which at least one transducer core having at least one electrical-acoustic transducer element, for example, a piezoelectric element, is embedded. At least this housing should be separated from the tube wall of the flow pipe by the thermal decoupling element, so that heat transfer from the tube wall of the flow pipe to the housing is at least reduced, in particular with the aforementioned characteristic variables with regard to the reduction in the thermal transfer.

The thermal decoupling element may be equipped in various ways. In a first preferred embodiment of the present invention, the thermal decoupling element may include bellows, for example. Bellows are understood to refer to a coupling having at least one wall material to couple a body to one end and to another end. For example, the flow pipe may be coupled directly or indirectly to one end of the ultrasonic transducer and directly or indirectly to the opposite end. Bellows here are designed by definition in such a way that a direct distance between the coupled bodies is smaller than a connecting distance between these bodies, which follows the wall of the bellows. For example, the bellows may be designed as bag bellows; in particular the bellows may be partially or entirely made of a metallic material, as explained in greater detail below.

Alternatively or additionally, the thermal decoupling element may include at least one area of a reduction in wall thickness. In particular the wall thickness in this area may be reduced to less than half, preferably to less than one third in comparison with a wall thickness of the flow pipe, for example, with an average wall thickness of the flow pipe in the measuring section. The wall thickness in the area of the reduction in wall thickness is preferably less than 1.0 mm, preferably less than 0.5 mm. In the area of the reduction in wall thickness, the thermal decoupling element may be manufactured, for example, entirely or partially from a metallic material, for example, one or more of the metallic materials described below. In addition, alternatively or additionally, the area of reduced wall thickness may also coincide entirely or partially with the optional bellows described above. However, a separate design is also possible in principle.

In another preferred embodiment, which is also implementable alternatively or additionally, the thermal decoupling element may be manufactured entirely or partially of a material having a thermal conductivity of less than 100 W/(m·K). This thermal conductivity may be given at 20° C., for example. In particular this material may be a material having a thermal conductivity of less than 50 W/(m·K) and more preferably less than 30 W/(m·K). Such low thermal conductivity values may preferably also be implemented by metallic materials because the conventional plastic materials cannot usually be used at the operating temperatures mentioned above. Alternatively or additionally, however, plastics such as thermal high-performance plastics, which may be used either filled or unfilled, may also be used in principle. However, the combination of at least one metallic material is preferable in particular. Metallic materials having a low thermal conductivity in particular should be used here. It is preferable in particular to use steels because they have a low thermal conductivity. Of these, it is again preferable to use chromium-nickel steel in particular. Such chromium-nickel steels typically have a thermal conductivity between 15 and 25 W/(m·K), so that this thermal conductivity range is preferred in particular. Essentially, however, other materials may also be used alternatively or additionally. For example, the bellows described above and/or the area of the reduction in wall thickness may be manufactured entirely or partially of the material having the thermal conductivity given above.

To be able to utilize the aforementioned advantages in a targeted manner, the decoupling element may also be composed of multiple individual parts, which may be made of various materials, for example. Alternatively or additionally, the decoupling element may have a thermal conductivity, which is below the thermal conductivity of the flow pipe by a factor of at least 2, but preferably by a factor of at least 3, and more preferably by a factor of at least 10, at least over a limited range of the decoupling element.

As explained above, it is preferable in particular if the flow pipe is designed to be essentially straight in the measuring section. In principle, minimal deviations from a straight design may also be tolerated, for example, irregularities in a wall of the flow pipe. However, the ultrasonic signals should still be able to propagate in the flow pipe, essentially parallel to the main direction of flow.

The at least one ultrasonic transducer may be coupled to at least one pipe end of the flow pipe, in particular via the thermal decoupling element. At least two ultrasonic transducers, which are coupled to opposite pipe ends of the flow pipe, may be provided in particular, each preferably having at least one thermal decoupling element.

On the whole, lateral connections, preferably pipe sockets, may be provided on the flow pipe. These lateral connections may be used in particular to guide the flowing fluid medium into the flow pipe and to guide it out of the flow pipe after passing through all or part of the flow pipe. For example, the connections may be provided on opposite sides of the flow pipe or on the same side. An angularly offset design relative to an axis of the flow pipe is also possible.

In addition to the flow meter in one or more of the embodiments described above, a method for measuring a flow of a fluid medium is also provided as described above. In this method, which may be performed according to the transit time principle according to the related art as described above, for example, a flow meter according to one or more of the embodiments described above is used. The fluid medium has a temperature of at least 100° C., preferably at least 150° C. In addition, the fluid medium may be contaminated with one or more of the following contaminants, as explained above, for example: soot, acids, water, oil. In addition, the method may also be performed in an oscillating column of gas inside the measuring section, for example, with oscillations in the range of 10 Hz and 1000 Hz.

BRIEF DESCRIPTION OF THE DRAWING

FIG. 1 shows an exemplary embodiment of a flow meter according to the present invention.

DETAILED DESCRIPTION

FIG. 1 shows an exemplary embodiment of a flow meter 110 according to the present invention. Flow meter 110 may be used in an exhaust line of an internal combustion engine. However, other applications are also possible in principle.

Flow meter 110 includes a first ultrasonic transducer 112 and a second ultrasonic transducer 114 as well as a measuring section 116 extending between these ultrasonic transducers 112, 114. Measuring section 116 allows propagation of ultrasonic signals between ultrasonic transducers 112, 114, this propagation being characterized symbolically with reference numeral 119 in FIG. 1. For example, first ultrasonic transducer 112 may emit an ultrasonic signal, which is received by second ultrasonic transducer 114 or vice versa. It should be pointed out that reflection systems are also possible in principle.

Measuring section 116 includes a flow pipe 118 having a flow pipe wall 120 made of a metallic material, for example. Flow pipe 118 includes lateral connections 122 in the form of pipe sockets 124, which are situated on opposite ends of flow pipe 118 on opposing sides in this exemplary embodiment. These pipe sockets 124 allow an oncoming flow 126 of fluid medium into flow pipe 118 and an outgoing flow 128 of the fluid medium out of flow pipe 118 after passing through measuring section 116 or an effective portion 130 of measuring section 116. An effective portion of measuring section 130 here is understood to be an area in which a main direction of flow 132 of the fluid medium is essentially parallel to propagation 119 of the ultrasonic signals. For example, main direction of flow 132 in this area may run parallel to a pipe axis 134 of flow pipe 118.

Ultrasonic transducers 112, 114 each include a transducer core 136. This transducer core 136 may be accommodated in a housing 138, for example, which may be designed to be separate or at least partially in one piece with other elements of measuring section 116. Housing 138 and/or ultrasonic transducers 112, 114 are separated from flow pipe 118 by at least one thermal decoupling element 140. These thermal decoupling elements 140 allow a mechanical fixation of ultrasonic transducers 112, 114 on the one hand, while on the other hand, these thermal decoupling elements 140 reduce the propagation of heat from flow pipe 118 to ultrasonic transducers 112, 114.

In the exemplary embodiment shown here, thermal decoupling elements 140 may be designed entirely or partially as bellows 142. As explained above, however, other embodiments are also possible alternatively or additionally. For example, thermal decoupling element 140 may be designed alternatively or additionally so that it has an area 144 having a reduced wall thickness in comparison with the wall thickness of flow pipe 118, for example, a wall thickness of less than 0.5 mm. The length of the connection of ultrasonic transducers 112, 114 to flow pipe 118 is increased by the folding of bellows 142, so that the dimensions of flow meter 110 may be kept as small as possible on the whole. To reduce heat transport, thermal decoupling element 140 may also include a material having the lowest possible thermal conductivity, again alternatively or additionally, or may be manufactured entirely or in part of such a material. Examples of such materials include chromium-nickel steel, iron-nickel alloys (for example, Invar, Fe-36Ni), $Al_2O_3$, or other materials. For example, metallic and/or ceramic materials may be used. In principle, the use of thermal high-performance plastics is also possible alternatively or additionally.

However, the use of plastics is generally less preferred because the temperatures which generally occur in an exhaust line are typically too high to allow the use of plastics.

What is claimed is:

1. A flow meter for use in a flowing fluid medium, comprising:
   at least one measuring section including at least one flow pipe through which the fluid medium is able to flow in a main direction of flow;
   at least one ultrasonic transducer equipped to emit ultrasonic signals substantially parallel to the main direction of flow into the measuring section; and
   at least one thermal decoupling element separating the ultrasonic transducer from the flow pipe, the thermal decoupling element being equipped to reduce heat transfer from the flow pipe to the ultrasonic transducer.

2. The flow meter according to claim 1, wherein the thermal decoupling element includes bellows.

3. The flow meter according to claim 1, wherein the flow pipe is substantially straight in the measuring section, the at least one ultrasonic transducer being coupled to at least one pipe end of the flow pipe via the thermal decoupling element.

4. The flow meter according to claim 1, wherein at least two ultrasonic transducers are provided, the at least two ultrasonic transducers being coupled to opposing pipe ends of the flow pipe.

5. The flow meter according to claim 1, wherein lateral connections, including pipe sockets, are situated on the flow pipe to direct the flowing fluid medium into the flow pipe, and after passing through the flow pipe, to direct the flowing fluid medium out of the flow pipe.

6. The flow meter according to claim 1, wherein the thermal decoupling element is manufactured entirely or in part from a material having a thermal conductivity of less than 100 W/(m·K).

7. The flow meter according to claim 6, wherein the thermal conductivity is less than 50 W/(m·K).

8. The flow meter according to claim 6, wherein the thermal conductivity is less than 30 W/(m·K).

9. The flow meter according to claim 1, wherein the thermal decoupling element is manufactured entirely or in part from steel, including a CrNi steel.

10. The flow meter according to claim 1, wherein the thermal decoupling element includes an area of a reduction in a wall thickness.

11. The flow meter according to claim 10, wherein the wall thickness in the area of the reduction in wall thickness is less than 1.0 mm.

12. The flow meter according to claim 11, wherein the wall thickness is less than 0.5 mm.

13. The flow meter according to claim 10, wherein the wall thickness in the area of the reduction in wall thickness is less than half of an average wall thickness of the flow pipe.

14. The flow meter according to claim 13, wherein the wall thickness is less than one third of the average wall thickness of the flow pipe.

15. The flow meter according to claim 1, wherein the flow meter measures a flow of a fluid medium, the fluid medium being at a temperature of at least 100° C.

16. The flow meter according to claim 15, wherein the temperature is at least 150° C.

\* \* \* \* \*